United States Patent [19]
Edwards

[11] 3,811,634
[45] May 21, 1974

[54] CARTRIDGE STRIPPING
[75] Inventor: Evan A. Edwards, Pittsford, N.Y.
[73] Assignee: Eastman Kodak Company, Rochester, N.Y.
[22] Filed: Mar. 15, 1972
[21] Appl. No.: 234,797

[52] U.S. Cl. ................ 242/55, 221/70, 242/71.2
[51] Int. Cl. ....................... B65h 75/02, B65h 5/28
[58] Field of Search ............... 242/55, 71.2, 71.1; 206/52 F, 59 E; 221/70, 71

[56] References Cited
UNITED STATES PATENTS

| | | | |
|---|---|---|---|
| 2,419,809 | 4/1947 | Avery | 221/70 |
| 3,283,886 | 11/1966 | Addis | 221/70 X |
| 2,276,296 | 3/1942 | Flood | 221/70 |
| 2,341,368 | 2/1949 | Flood | 221/70 X |
| 3,698,600 | 10/1972 | Foote | 221/70 |
| 3,255,977 | 6/1966 | Halco | 242/55 |

Primary Examiner—John W. Huckert
Assistant Examiner—Edward J. McCarthy
Attorney, Agent, or Firm—K. Donald Fosnaught

[57] ABSTRACT

A method and device for use in removing from a cartridge a strip of film that is interwound with a strip of backing material. The invention obviates the need for breaking open or otherwise mutilating the cartridge and, instead, contemplates withdrawing the backing material through a cartridge exposure aperture to, in turn, withdraw the film strip by contact with the backing material.

13 Claims, 6 Drawing Figures

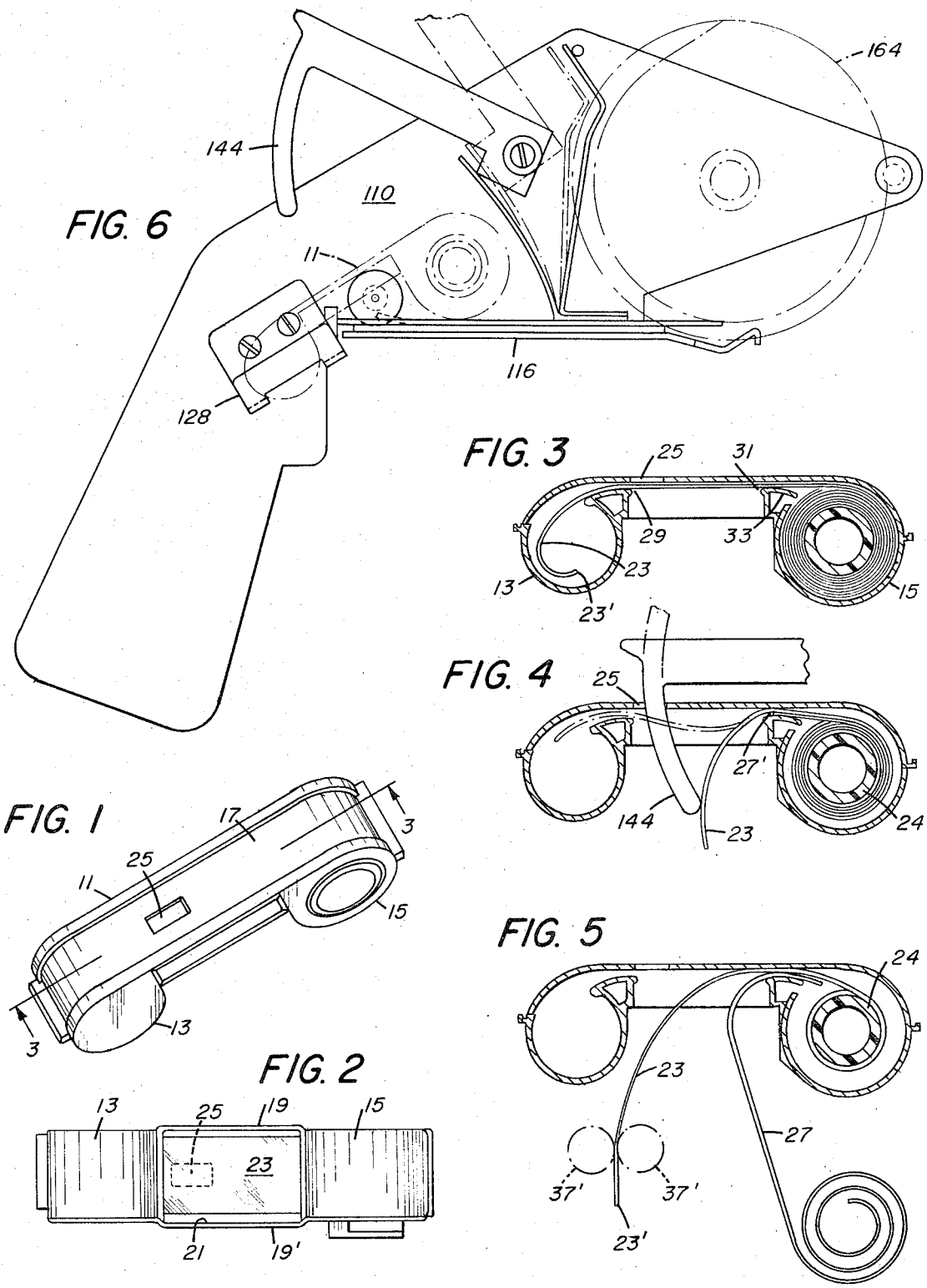

CARTRIDGE STRIPPING

BACKGROUND OF THE INVENTION

1. Field of the Invention

The invention relates to the field of film cartridges and, in particular, provides a way to remove exposed film from a film cartridge in preparation for photographic processing of the film.

2. Description Relative to the Prior Art

The development of the photographic art has, in recent years, been characterized by the increasing popularity of self-contained roll film cartridges. A typical such cartridge is described in U.S. Pat. No. 3,628,435 and includes interconnected takeup and supply chambers spaced at opposite ends of an exposure aperture. During use of such a cartridge in a camera, a film strip and a superimposed backing strip are incrementally advanced together from the supply chamber across the exposure aperture and into the takeup chamber. Successive areas of the film are thus sequentially exposed by the camera and stored within the takeup chamber to await photographic processing.

During photofinishing operations, however, the processor is faced with the task of removing the exposed film from the cartridge takeup chamber in order to photographically develop the exposed picture areas. Typically, the film is removed by fracturing or otherwise destroying the cartridge takeup chamber, and a device for use in such fracturing is disclosed in U.S. Pat. No. 3,411,682. It has been found that the fracturing operation generates particles of cartridge debris which may become scattered about the work place and contaminate or even scratch the film. Jagged portions of the fractured cartridge may also present a hazard. These undesirable features become increasingly troublesome when the cartridge to be opened contains film having a relatively small format. Some scratches and debris might go unnoticed upon a larger format film whereas the same imperfection, if present upon a smaller format film, could become objectionable after the developed picture produced from the miniature format has been enlarged to standard size.

SUMMARY OF THE INVENTION

It is therefore an object of this invention to provide method and means for removing exposed photographic film from a film cartridge while maintaining the cartridge intact.

It is a further object to provide such method and means whereby damage to the film during removal is minimized.

It has been found that film interwound with a backing strip may be removed from a film cartridge having an unobstructed exposure aperture without fracturing or otherwise mutilating the cartridge. By dislodging from the exposure aperture a trailing portion of the backing strip which extends beyond the film end, and then withdrawing the backing strip from the cartridge takeup chamber via the exposure aperture, the film has been found to accompany the backing strip from the takeup chamber even though the film is not itself engaged.

It has further been found that by positioning the trailing end of the film, prior to withdrawal, within a passageway formed in the cartridge takeup chamber frictional contact between the film and the cartridge may be reduced and the instant system of film extraction may be practiced with even greater assurance against film damage.

The present invention may be practiced in conjunction with a double-chambered film cartridge having an unobstructed exposure aperture intermediate the cartridge chambers and wherein, prior to presentation for film removal, the trailing film end lies within a takeup chamber passageway and the trailing portion of an interwound backing strip extends from the passageway and is disposed within the exposure aperture. In its presently preferred form, the invention contemplates use of a backing strip window associated with the exposure aperture, and means cooperative therewith, to dislodge the backing strip from the aperture, as will be described in greater detail hereinafter.

BRIEF DESCRIPTION OF THE DRAWINGS

FIG. 1 is a perspective view of a film cartridge useable in conjunction with the instant invention.

FIG. 2 is a bottom view of the cartridge of FIG. 1.

FIGS. 3, 4 and 5 are cross-sectional views of the cartridge of FIG. 1 taken along line 3—3 thereof and depict a sequence of steps in removing film according to the present invention.

FIG. 6 illustrates apparatus for use in employing the present invention.

DESCRIPTION OF THE PREFERRED EMBODIMENTS

Referring to the figures, a film cartridge 11 has spaced-apart supply and takeup chambers 13 and 15, which are interconnected by a channel defined by a cartridge back wall member 17 and parallel side rails 19, 19'. The walls of chambers 13 and 15, in combination with side rails 19 and 19' and back wall 17, cooperate to form a generally rectangular exposure aperture 21 wherein successive film image areas may be positioned and sequentially exposed when the cartridge is in use in a camera. The cartridge 11 further includes a rectangular backing strip window 25 formed in the back wall 17 by means of which exposure identification numbers (not shown) printed on the back side of a backing strip 23 may be viewed by the photographer. The cartridge takeup chamber 15 contains a rotatably mounted takeup core 24 engageable by a core drive mechanism of a camera (not shown).

In use, a photographic element comprised of a photosensitive film strip 27 superimposed upon the backing material strip 23 (which may, for example, be a light-impervious paper strip) is initially housed within the supply chamber 13. The leading end of the element initially extends through a supply chamber access opening 29, across the exposure aperture 21 and into takeup chamber 15 via a takeup chamber access opening 31 and is secured to takeup core 24. As described in copending application Serial number 25,848 filed on Apr. 6, 1970 which issued on Aug. 15, 1972 or U.S. Pat. No. 3,684,206 in the name of Evan A. Edwards and entitled Film Cartridge And Photographic Web For Use Therewith, the photographic element may be attached to the core solely by means of the backing strip 23. The film strip 27 thus need not be attached at any point to either the core 24 or to the backing strip 23 but may instead be in only frictional contact with the strip 23. During use in a camera, rotation of the core 24 by the camera drive mechanism draws the photographic element past the exposure aperture 21 and into the takeup chamber 15 wherein it is wound around the core 24 to form an interwound roll comprised of alternate convolutions of the film and backing material.

Upon use of the last film image area, the photographic element may be advanced by the camera mechanism an additional distance sufficient to cause the end 27' (hereinafter referred to as the trailing end) of the film strip 27 to enter the takeup chamber access opening 31. In accordance with a preferred embodiment of the invention the trailing film end 27' may be retained (as shown in FIGS. 3 and 4) within a narrow passageway cooperatively defined in the takeup chamber 15 by a lip member 33 and an opposing surface of the back wall 17. Such retention may, for example, be accomplished by the invention described in U.S. Pat. No. 2,559,892 or, desirably, by the invention described in copending application Ser. No. 63,879 filed on Aug. 14, 1970 which issued on Oct. 3, 1972 as U.S. Pat. No. 3,695,160 in the name of Willis Stockdale, and entitled Film Cartridge For Preventing The End Of A Film Strip From Entering A Cartridge Chamber. As is also shown in FIGS. 3 and 4, when the film end 27' has entered the takeup chamber 15 the backing material strip 23, because of its longer length has its trailing end 23' disposed within the supply compartment 13. A segment of the backing material strip then lies across the exposure aperture 21 (and across the window 25) upon the completion of strip advancement.

As shown in FIG. 2 the exposure aperture 21 forms an unobstructed opening having a width, as measured between parallel rails 19 and 19', which is greater than the widths of either the film 27 or the backing material 23. In accordance with a preferred method of practicing the invention the backing material 23 is first dislodged from the exposure aperture. In this regard, means such as a vacuum head could be inserted through the exposure aperture to engage and dislodge the backing material. The backing material 23 may, however be conveniently dislodged by inserting a suitably slender probe 144 through the window 25 as shown in FIG. 4. Alternative means such as a stream of pressurized air could also be passed through the window 25 to accomplish this task.

Once the backing strip 23 has been dislodged from the aperture 21, it may be grasped by suitable means such as, for example, a pair of pinch rollers 37, 37'. Backing strip 23 is then withdrawn from the takeup chamber 15. It has been found that such withdrawal of the backing strip 23 causes the film strip 27 to likewise be withdrawn from the takeup chamber as shown in FIG. 5. Such film strip withdrawal occurs even though, as previously set forth, the film strip 27 is only in frictional contact with the backing strip 23 and is not otherwise engaged. As shown in FIGS. 4 and 5, the film strip 27, as it passes from the takeup chamber 15, is desirably disposed between the backing strip 23 and cartridge lip 33 and is therefore in sliding contact with the cartridge structure only at the lip 33. Such minimal contact reduces the likelihood of damage to the film and is provided by the aforementioned pre-positioning of the trailing film end 27' within the takeup chamber passageway. If, however, the film end 27' is not so retained within the passageway but is, instead, allowed to wind completely onto the interwound roll and the film may still be withdrawn from the chamber by means of the invention. In such a case, the trailing film end 27', instead of passing directly through the passageway, will first follow around the cylindrical inner surface of the takeup chamber 15 before exiting through the passageway. With such an arrangement, however, the film is in undesirable frictional contact with the entire inner surface of takeup chamber 15, and as the film passes through the access opening 31 it will be disposed between backing strip 23 and back wall member 17.

FIG. 6 depicts apparatus 110 suitable for use with the present invention and comprising a cartridge positioning cradle 128 and a moveable probe 144 for insertion through the backing paper window 25. The backing strip 23, once dislodged by the probe 144 may then be grasped by hand and withdrawn from the cartridge takeup chamber. The film strip 27 is then itself withdrawn and guided along a predetermined path, defined by guide track 116 and into a processing reel 164 preparatory to photographic processing of the film.

The invention has been described in detail with particular reference to preferred embodiments thereof, but it will be understood that variations and modifications can be effected within the spirit and scope of the invention.

I claim:

1. The method of extracting a web strip from a cartridge, said cartridge including a chamber defined in part by a curved wall and having a chamber access opening, said web strip being interwound with a backing strip to form a roll housed within said chamber, said web strip having a trailing end disposed within said chamber, said cartridge further defining an exposure aperture adjacent said chamber access opening, said aperture having a width at least as great as the respective widths of said web strip and said backing strip, said backing strip having a trailing end portion extending from said roll, through said access opening and into said exposure aperture, said method comprising the steps of:

a. dislodging said backing material strip from said exposure aperture;
   b. engaging said trailing end portion of said backing strip; and
   c. displacing said backing strip with respect to said chamber to withdraw said backing strip from said chamber, thereby to extract said web strip from said chamber through contact with said backing strip.

2. The invention of claim 1 wherein said cartridge further defines a passageway within said chamber and in communication with said access opening and wherein said trailing end of said web strip is left disposed within said passageway, whereby while withdrawing said backing strip from said chamber said web strip does not contact the internal surface of the wall defining said chamber.

3. The invention of claim 1 wherein said exposure aperture is further defined by a support wall generally opposing said segment of said trailing end portion of said backing material, said wall having formed therein a window, and including the additional step of:

passing dislodging means through said window to position said backing strip segment away from said wall.

4. The method of extracting a strip of film from a cartridge of the type including spaced supply and takeup chambers having respective chamber access openings, said cartridge having means for defining a passageway within said takeup chamber and in communication with said takeup chamber access opening, said film strip being superimposed upon and interwound with a strip of backing material to form a roll, said roll being housed within said takeup chamber and said film strip having a trailing end portion extending from said roll and terminating within said passageway, said backing strip having a trailing end portion extending from said roll through said passageway and said access openings and terminating within said supply compartment, said method comprising the steps of:
- a. engaging said trailing end portion of said backing material and
- b. withdrawing said backing material from said takeup chamber to extract said film strip from said takeup chamber through contact with said backing strip.

5. The invention of claim 4 wherein said cartridge further includes channel means for interconnecting said supply and takeup chambers at areas adjacent said respective chamber access openings and for defining, in combination with said chambers, an exposure aperture having a width greater than the respective widths of said film strip and said backing material, and wherein a segment of said trailing end portion of said backing material is disposed within said exposure aperture, including the further step of:
    displacing said segment of said backing material trailing end portion through said exposure aperture.

6. The invention of claim 5 wherein said channel means further defines a support wall generally opposing said segment of said trailing end portion of said backing material, said support wall having an access window formed therein, and including the further step of:
    displacing said backing material trailing end segment away from said wall via said window.

7. Apparatus for use in extracting a web strip from a cartridge having a chamber defined in part by a curved wall and having a chamber access opening, said web strip being interwound with a backing strip to form a roll housed within said chamber, said web strip having a trailing end disposed within said chamber, said cartridge further defining an exposure aperture located adjacent said access opening and having a width at least as great as the respective widths of said web strip and said backing strip, said backing strip having a trailing end portion extending from said roll, through said access opening, and into said exposure aperture, said apparatus comprising:
- a. means for dislodging said backing strip from said exposure aperture; and
- b. means for engaging said trailing portion of said backing strip and for displacing said backing strip with respect to said cartridge to withdraw said backing strip from said chamber, thereby to extract said web strip from said chamber through contact with said backing strip.

8. The invention of claim 7 wherein said cartridge further defines a passageway within said chamber and in communication with said access opening and wherein said trailing end of said web strip is left disposed within said passageway, whereby while withdrawing said backing strip from said chamber said web strip does not contact the internal surface of the wall defining said chamber.

9. The invention of claim 8 wherein said exposure aperture is further defined by a support wall generally opposing said segment of said trailing end portion of said backing material, said wall having formed therein a window, and wherein said dislodging means includes means for passing through said window to position said backing strip segment away from said wall.

10. The invention of claim 1 wherein said web strip is not attached to said backing strip but is solely in frictional contact therewith.

11. The invention of claim 10 wherein said cartridge further includes a rotatable winding core disposed within said chamber and wherein the leading end of said backing strip is attached to said core.

12. The invention of claim 7 wherein said web strip is not attached to said backing strip but is solely in frictional contact therewith.

13. The invention of claim 12 wherein said cartridge further includes a rotatable winding core disposed within said chamber and wherein the leading end of said backing strip is attached to said core.

* * * * *